United States Patent
Thörn et al.

(10) Patent No.: US 8,994,672 B2
(45) Date of Patent: Mar. 31, 2015

(54) CONTENT TRANSFER VIA SKIN INPUT

(75) Inventors: Ola Thörn, Limhamn (SE); Henrik Bengtsson, Lund (SE); Håkan Jonsson, Hjärup (SE); Linus Mårtensson, Lund (SE); Pär-Anders Aronsson, Malmö (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 418 days.

(21) Appl. No.: 13/441,986

(22) Filed: Apr. 9, 2012

(65) Prior Publication Data

US 2013/0265437 A1 Oct. 10, 2013

(51) Int. Cl.
G06F 3/041 (2006.01)
G06F 3/01 (2006.01)
H04W 4/00 (2009.01)
G02B 27/01 (2006.01)
H04W 4/20 (2009.01)

(52) U.S. Cl.
CPC ............... *G06F 3/011* (2013.01); *G06F 3/013* (2013.01); *G06F 3/015* (2013.01); *G06F 3/016* (2013.01); *G06F 3/017* (2013.01); *H04W 4/00* (2013.01); *G02B 27/017* (2013.01); *G02B 2027/0138* (2013.01); *G02B 2027/014* (2013.01); *G02B 2027/0187* (2013.01); *H04W 4/206* (2013.01)
USPC ........................................................ 345/173

(58) Field of Classification Search
CPC ......... G06F 3/041; G06F 3/043; G06F 3/045; G09G 5/00
USPC .................................................. 345/156–178
See application file for complete search history.

(56) References Cited

U.S. PATENT DOCUMENTS

| | | | |
|---|---|---|---|
| 8,190,749 B1 * | 5/2012 | Chi et al. ....................... | 709/227 |
| 2002/0021601 A1 * | 2/2002 | Chornenky ................... | 365/200 |
| 2007/0282783 A1 * | 12/2007 | Singh ................................ | 707/1 |
| 2011/0205156 A1 * | 8/2011 | Gomez et al. ................. | 345/157 |
| 2012/0249409 A1 * | 10/2012 | Toney et al. ................... | 345/156 |
| 2012/0324368 A1 * | 12/2012 | Putz et al. ...................... | 715/748 |
| 2013/0174049 A1 * | 7/2013 | Townsend et al. ............. | 715/748 |

OTHER PUBLICATIONS

Skinput: Appropriating the Body as an Input Surface. www.chrisharrison.net/index.php/Research/Skinput.
Harrison, C., Tan, D. Morris, D. 2010. Skinput: Appropriating th Body as an Input Surface. In Proceedings of the 28th Annual SIGCHI Conference on Human Factors in Computing Systems (Atlanta, Georgia, Apr. 10-15, 2010). CHI '10. ACM, New York, NY. 453-462.

* cited by examiner e

*Primary Examiner* — Kent Chang
*Assistant Examiner* — Nathan Brittingham
(74) *Attorney, Agent, or Firm* — Sreenivas Vedantam; Moore & Van Allen PLLC (57) ABSTRACT

The invention is directed to systems, methods and computer program products for transferring content between electronic devices via skin input. An exemplary method includes detecting, by an interface device, an input received on a user's skin, wherein the interface device is in electronic communication with at least one of the first device or the second device; in response to detecting the input, determining the type of input; and at least one of: in response to determining the type of input is a first type of input, initiating transmission of content from the first device to the second device; or in response to determining the type of input is a second type of input, initiating reception of content at the second device.

19 Claims, 7 Drawing Sheets

CONTENT TRANSFER VIA SKIN INPUT

BACKGROUND

When a user wants to transfer content from a first device to a second device, the user can transfer the content via a network connection (e.g., via email). In order to execute this transfer, a user has to interact with the first device (e.g., via a keypad, mouse, etc.) to transfer the content to a network location (e.g., an email account). In order to receive the content at the second device, a user has to interact with the second device (e.g., via a keypad, mouse, etc.) to download the content from the network location.

Alternatively, the user can transfer the content from the first device to a second device via a physical content-transferring device (e.g., a portable universal serial bus (USB) drive). This method requires the user to transfer the content to the content-transferring device by plugging the content-transferring device into a receiving socket associated with the first device. Additionally, the user receives the content at the second device by plugging the content-transferring device into a receiving socket associated the second device and downloading the content from the content-transferring device.

Additionally, for each application that enables transfer of content, the user has to become familiar with the functions (e.g., menus, icons, etc.) of the application in order to execute the processes of transmitting content associated with the application and/or receiving content associated with the application. Not only does the user have to become familiar with the various menu hierarchies associated with the application, but the user also has to become familiar with any esoteric or proprietary standards associated with the content being transmitted or received.

What is needed is a simpler and seamless method to transfer content from a first device to a second device.

BRIEF SUMMARY

Embodiments of the invention are directed to systems, methods and computer program products for transferring content between electronic devices via skin input. In some embodiments, an exemplary method for transmitting content from a first device to a second device comprises: detecting, by an interface device, an input received on a user's skin, wherein the interface device is in electronic communication with at least one of the first device or the second device, and wherein the interface device comprises at least one sensor, microphone, or camera that detects a vibration (e.g., a mechanical vibration) associated with the user's body when the input is received on the user's skin; in response to detecting the input, determining the type of input; and at least one of: in response to determining the type of input is a first type of input, initiating transmission of content from the first device to the second device; or in response to determining the type of input is a second type of input, initiating reception of content at the second device.

In some embodiments, the interface device projects a user interface associated with at least one of the first device, the second device, or the interface device onto at least one of the user's skin or a head-mounted display.

In some embodiments, the method further comprises determining whether the content is dragged towards an edge of a visual interface associated with the first device, wherein the content is dragged towards the edge of the visual interface using at least one of input received at the first device or input received on the user's skin.

In some embodiments, the determining whether the content is dragged towards an edge of a visual interface associated with the first device is executed at least one of prior to or after receiving the input on the user's skin.

In some embodiments, the interface device projects a clipboard interface onto at least one of the user's skin or a head-mounted display, the clipboard interface presenting the content being transmitted from the first device to the second device.

In some embodiments, the interface device projects a user interface associated with at least one of the first device, the second device, or the interface device onto a location of a user's skin, wherein at least one of the location or a type of information presented on the user interface is based at least partially on whether the interface device is at least one in contact with the user's skin or in contact with a different user's skin.

In some embodiments, the method further comprises initiating reception of content at the interface device, the content being transmitted from the first device; and initiating transmission of content from the interface device to the second device.

In some embodiments, the method further comprises completing transmission of content from the first device to the second device based on input received by at least one of the interface device, the first device, the second device, or the user's skin.

In some embodiments, the method further comprises determining a location of projection of the user interface onto the user's skin or a different user's skin; distinguishing sensitive information from non-sensitive information, wherein the content received at the interface device comprises at least one of sensitive information and non-sensitive information; and at least one of: in response to determining the location of projection on the user's skin or the different user's skin is a substantially public location, projecting the non-sensitive information onto the user interface and screening the sensitive information; in response to determining the location of projection on the user's skin is a substantially private location, projecting both the sensitive information and the non-sensitive information onto the user interface; or in response to determining the location of projection on the different user's skin is a substantially private location, screening both the sensitive information and the non-sensitive information.

In some embodiments, the interface device comprises at least one sensor, microphone, or camera that detects a mechanical vibration associated with the user's body when the input is received on the user's skin.

In some embodiments, the method further comprises determining whether the user intends to interact with at least one of the first device or the second device.

In some embodiments, the determining step further comprises: using at least one image-capturing device associated with at least one of the interface device, the first device, or the second device: determining whether a body part of the user is pointing substantially in a direction of at least one of the first device or the second device, and determining movement of the body part; and converting the movement of the body part into an input instruction to at least one of the first device, the second device, or the interface device.

In some embodiments, the method further comprises determining, using at least one of the interface device or a separate gaze-determining device (e.g., a head-mounted display), a direction associated with the user's gaze; and at least one of: determining the user intends to interact with the first device when the user's gaze is directed substantially at the first device; determining the user intends to interact with the second device when the user's gaze is directed substantially at the second device; or determining the user intends to interact with a user interface presented on the user's skin (or intends to interact with the interface device) when the user's gaze is directed substantially at the user's skin.

In some embodiments, the interface device comprises at least one of a bracelet wearable on the user's arm or a visor wearable on the user's head.

In some embodiments, the interface device comprises at least one of an image-capturing module or a wireless communication module (e.g., a near field communication (NFC) chip).

In some embodiments, the at least one sensor or camera comprises an infrared (IR) sensor or camera.

In some embodiments, the interface device is either in contact with or not in contact with the user's skin.

In some embodiments, the interface device is not in contact with the user's skin, and is in contact with a different user's skin.

In some embodiments, the input received on the user's skin comprises a contact on the user's skin, wherein the contact on the user's skin comprises a contact of at least one of a body part or an object on the user's skin. In some embodiments, the determining step comprises determining at least one of: a type of contact (tap, drag, etc.) on the user's skin, an approximate location of contact on the user's skin, a duration of contact with the user's skin, a speed or acceleration associated with the contact on the user's skin, a pressure or force associated with the contact on the user's skin, a quantity of distinct contacts with the user's skin, a duration between distinct contacts with the user's skin, a direction of the user's gaze when the contact occurs, or a direction associated with the user's body part when the contact occurs.

In some embodiments, at least one of the first device or the second device comprises at least one of a portable mobile communication device, a television, a computing device, a tablet, or a watch.

In some embodiments, an exemplary system is provided for transmitting content from a first device to a second device. The system comprises: an interface device comprising at least one sensor, camera, or microphone that detects a vibration (e.g., a mechanical vibration) associated with the user's body, and a processor configured to determine a type of input based at least partially on the vibration; and at least one of: in response to determining the type of input is a first type of input, initiate transmission of content from the first device to the second device; or in response to determining the type of input is a second type of input, initiate reception of content at the second device, wherein the system is in communication with at least one of the first device or the second device.

In some embodiments, an exemplary computer program product is provided for transmitting content from a first device to a second device. In some embodiments, the computer program product comprises a non-transitory computer-readable medium comprising code configured to: initiate communication with at least one of the first device or the second device; determine a type of input based at least partially on detecting a vibration (e.g., a mechanical vibration) associated with a user's body; and at least one of: in response to determining the type of input is a first type of input, initiate transmission of content from the first device to the second device; or in response to determining the type of input is a second type of input, initiate reception of content at the second device.

BRIEF DESCRIPTION OF THE DRAWINGS

Having thus described embodiments of the invention in general terms, reference will now be made to the accompanying drawings, where:

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Skin input refers to providing input to an interface device via the user's skin. An interface device enabled to receive skin input detects contact (or a tap) associated with one or more portions of the user's skin and converts the detected contact to an input instruction.

Embodiments of the invention are directed to systems, methods, and computer program products for transferring content from a first device to a second device. As used herein, content refers to text, graphics, files, media, etc. Media refers to any audiovisual media. In some embodiments, an exemplary method comprises detecting, by an interface device, an input received on a user's skin, wherein the interface device is in electronic communication with at least one of the first device or the second device. Additionally, the method comprises determining, by the interface device, the type of input in response to detecting the input. Additionally, the method comprises at least one of: in response to determining the type of input is a first type of input, initiating transmission of content from the first device to the second device; or in response to determining the type of input is a second type of input, initiating reception of content at the second device.

Figure 1:
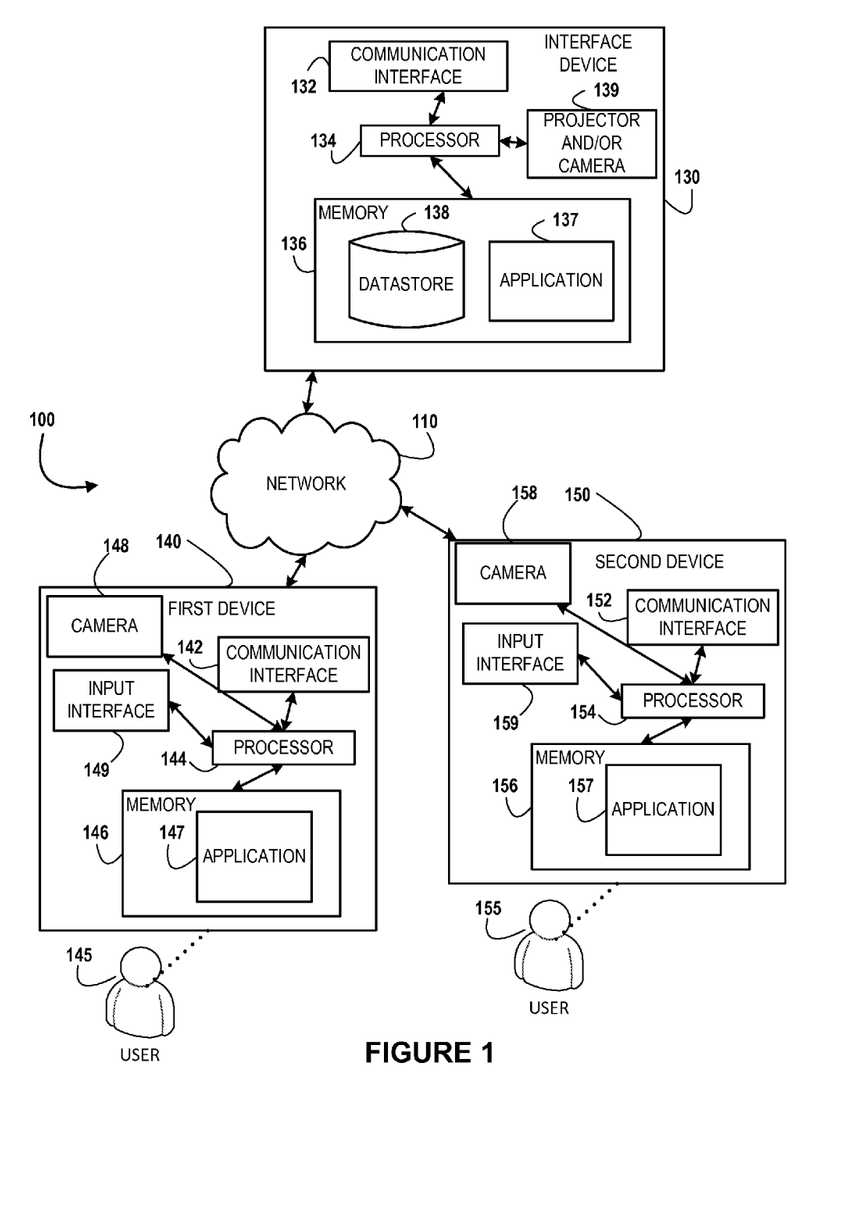
FIG. 1 is an exemplary system environment for transferring content from a first device to a second device, in accordance with embodiments of the present invention.

Referring now to FIG. 1, FIG. 1 presents a system environment for transferring content from a first device to a second device. FIG. 1 presents a first device 140, a second device 150, and an interface device 130. Examples of the first device 140 and/or the second device 150 include, but are not limited to, mobile computing devices (e.g., mobile phones), image-capturing devices (e.g., cameras), gaming devices, laptop computers, portable media players, tablet computers, e-readers, scanners, watches, other portable or non-portable computing or non-computing devices, as well as, in some embodiments, one or more components thereof and/or one or more peripheral devices associated therewith.

Each of the first device 140 and the second device 150 may comprise an input interface 149 and 159, a communication interface 142 and 152, a processor 144 and 154, and a memory 146 and 156. The input interface 149 and 159 may comprise one or more user input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user 145 and 155 and/or some other user. In some embodiments, the input interface 149 and 159 includes the input and display devices of a personal computer, such as a keyboard and monitor, which are operable to receive and display information. The communication interface 142 and 152 may permit the devices 140 and 150 to communicate with the other devices presented in FIG. 1. The processor 144 and 154 may be used to execute an application 147 and 157 (e.g., a transmitting and/or receiving application stored in the memory). Additionally, the first device 140 and the second device 150 may comprise a camera or other image-capturing module 148 and 158. Although not shown in FIG. 1, both the first device 140 and the second device 150 may comprise one or more datastores. In some embodiments, the user 145 and the user 155 may be the same user.

The interface device 130 may comprise a communication interface 132, a processor 134, a memory 136, and a projector and/or camera or other image-capturing module 139. The communication interface 132 may enable the interface device 130 to interact with the other device presented in FIG. 1. The processor 134 may be used to execute an application 137 comprised in the memory 136. Example applications include an application to project a clipboard interface onto a user's skin using the projector 139, or to determine a direction associated with a user's gaze or a user's body part using the camera or other image-capturing module 139. Additionally, the memory may comprise a datastore 138. The datastore 138 may temporarily or permanently store the data transmitted from the first and/or second device to the interface device 130. Any processor described herein may include functionality to operate one or more software programs based at least partially on computer-executable program code portions thereof, which may be stored, for example, in a memory device.

In some embodiments, as shown in FIG. 1, the devices are each operatively and selectively connected to the network 110, which may include one or more separate networks. In addition, the network 110 may include a local area network (LAN), a wide area network (WAN), and/or a global area network (GAN), such as the Internet. It will also be understood that the network 110 may be secure and/or unsecure and may also include wireless and/or wireline and/or optical interconnection technology. In other embodiments, each of the devices presented in FIG. 1 (and FIG. 2) may directly communicate with each other via one or more wired or wireless mechanisms (and do not communicate with each other via the network). Examples of wireless mechanisms include near-field communication (NFC), infrared transmission (IR), Bluetooth, short-range radio frequency (RF) signals, IEEE 802.11x, WiFi, wireless universal serial bus (USB), HomeRF, IrDA-based (Infrared Data Association) transmission, etc. The invention is not limited to any wired or wireless mechanisms described herein.

The interface device 130 comprises at least one of a bracelet wearable on the user's arm (e.g., around the biceps or triceps) or a visor wearable on the user's head. The interface device may comprise one or more sensors, microphones, cameras, etc. The interface device 130 comprises at least one sensor that detects a vibration (e.g., a mechanical vibration) associated with the user's body when input is received on the user's skin. In some embodiments, the interface device 130 additionally or alternatively comprises at least one microphone that detects sound associated with input received on the user's skin. For example, a touch on the user's skin causes a particular body part (muscle, bone, tissue, etc.) to produce a distinctive sound. In some embodiments, the interface device 130 additionally or alternatively comprises at least one camera that constantly captures video and captures an image of a touch on the user's skin.

In some embodiments, the sensor may be an infrared (IR) sensor. The IR sensor has the ability to measure IR light radiating from objects in its field of view. In some embodiments, the skin input is detected when an IR source (e.g., the user's finger) touches another IR source (e.g., the user's wrist on which a user interface is projected). The skin input may be detected when both IR sources have different temperatures and/or even when both IR sources have substantially the same temperature. In some embodiments, the camera may an IR camera. The IR camera may capture an IR image of a touch on the user's skin. Since the IR camera uses IR radiation, the IR camera may capture an image of a touch on the user's skin even in darkness.

In some embodiments, the vibration and/or sound and/or image and/or the radiated light (e.g., IR light) associated with the skin input may be used by the interface device 130 to detect an approximate position of the input on the user's skin. As used herein, input or touch received on the user's skin refers to a contact (e.g., a physical contact) on the user's skin or in the space (e.g., air space) above the user's skin. As used herein, the skin may be the skin associated with any part of the user's anatomy. Exemplary parts include the head and neck (parts of the body above the thoracic inlet such as the face, ear, nose, tongue, eye, lips, etc.), the upper limb (forearm, arm, elbow, shoulder, hand, wrist, palm, finger, etc.), the thorax, the abdomen, the back, the pelvis, the lower limb (hip, thigh, knee, leg, ankle, foot, toe, etc.), etc.

The touch on the user's skin may be made by a body part of the user (direct touch) or via an object (indirect touch). An example of direct touch is when the user's body part (e.g., the user's left index finger) touches the user's skin (e.g., the user's right palm). An example of an indirect touch is when the user holds a physical object in the user's left hand (e.g., a stylus, a ball-shaped object, a cookie-shaped or chip-shaped object, etc.) and touches the user's skin (e.g., the user's right palm) with the physical object held by the user's left hand. In an indirect touch embodiment, the user may not directly touch the user's skin (e.g., the user's right palm) with a body part of the user (e.g., the user's left index finger).

The contact with the user's skin may be processed by the interface device 130 to determine an input instruction associated with the contact. For example, the interface device 130 may determine at least one of: a type of contact (tap, drag, etc.) on the user's skin, an approximate location of contact on the user's skin, a duration of contact with the user's skin, a pressure or force associated with the contact on the user's skin, a speed or acceleration associated with the contact with the user's skin, a quantity of distinct contacts with the user's skin, a duration between distinct contacts with the user's skin, a direction of the user's gaze when the contact occurs, or a direction associated with the user's body part when the contact occurs. Each of these determinations may also be referred to as characteristics associated with the user's input or touch. The at least one determination described herein may be used to determine an input instruction (or a gesture) associated with the user's touch. Each input instruction (e.g., select an icon, copy content, transmit content, receive content, move content, close content, etc.) may be associated with at least one determination associated with at least one touch. The various types of touch (tap, drag, etc.) are described later in the specification.

In some embodiments, the interface device 130 may be located on a first user's body, and the touch may be detected on a different user's skin. In such embodiments, the interface device 130 comprises a proximity sensor that detects the touch on the different user's skin, and determines an input instruction (or a gesture) associated with the touch on the different user's skin.

In some embodiments, the interface device 130 comprises a projector (e.g., a microprojector). In some embodiments, the projector of the interface device 130 projects a user interface associated with at least one of the first device, the second device, or the interface device 130 onto at least one of the user's skin or a HMD system display (described later in the specification). In some embodiments, the interface device 130 may be used to project the user interface associated with at least one of the first device 140, the second device 150, or the interface device 130 onto a different user's skin or onto an HMD system display worn by a different user.

As used herein, a user interface is an interface that comprises one or more selectable options. In some embodiments, when the user selects one of the selectable options, the selected option is highlighted while the other selectable options remain unhighlighted. As used herein, highlighting an option may refer to changing the font or color of the option, changing the background color of the option, presenting a border around the option, projecting the option, etc. When the user selects an option, the selection may be detected by the interface device 130. In some embodiments, the selected option is an input instruction to the interface device 130. In other embodiments, the selected option (or the input instruction associated with the selected option) is transmitted from the interface device 130 to at least one of the first device 140, the second device 150, or the HMD system.

In some embodiments, the projector may project an entire user interface associated with at least one of the first device 140, the second device 150, or the interface device 130 onto the user's skin, while in other embodiments, the projector may project partial portions (e.g., menus options, numeric dial pads, alphanumeric keypads, game control options, etc.) of the user interface associated with at least one of the first device 140, the second device 150, or the interface device 130 onto the user's skin.

In some embodiments, the interface device 130 comprises at least one of an image-capturing module or a communication chip (e.g., an NFC chip). The communication chip may be used to transmit data to and/or receive data from at least one of the first device 140, the second device 150, or the HMD system 160. The image-capturing module may be used to determine a direction associated with a user's gaze or determine a direction and/or orientation associated with a user's body part. In other embodiments, the image-capturing module may also be used to capture an image associated with the user's touch on the user's skin.

The interface device 130 is either in contact with or not in contact with the user's skin. Therefore, in some embodiments, the interface device 130 can detect a touch on the user's skin (and process an input instruction associated with the touch) or on a different user's skin regardless of whether the interface device 130 is in touch with or not in touch with the user's skin.

Figure 2:
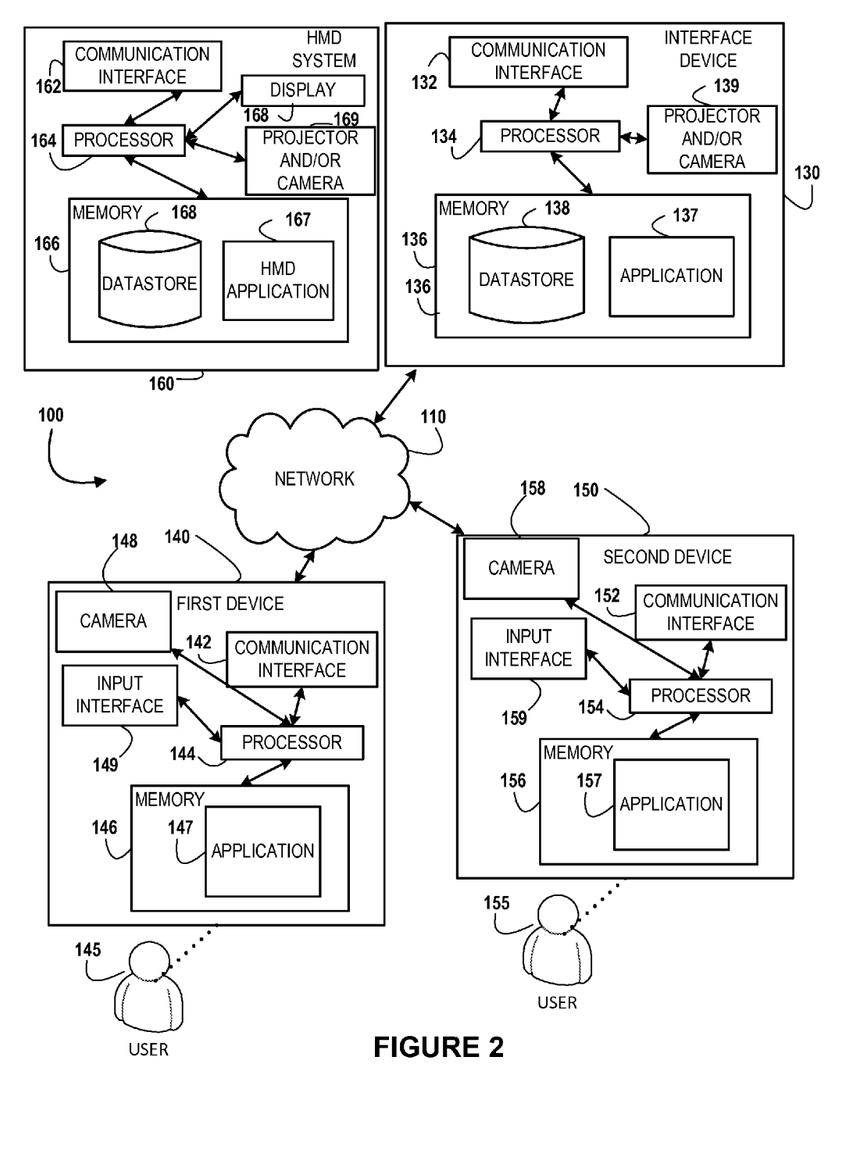
FIG. 2 is another exemplary system environment for transferring content from a first device to a second device, in accordance with embodiments of the present invention.

Referring now to FIG. 2, FIG. 2 presents another system environment for transferring content from a first device to a second device. The difference between the system environments presented in FIG. 1 and FIG. 2 is the addition of a head-mounted display (HMD) system 160 to FIG. 2. The head-mounted display (HMD) system 160 may also be referred to as a head-mounted device, a helmet-mounted device, a helmet-mounted display system, etc. A HMD system is a display system that may be worn on the head. An HMD system may take the form of eye-glasses, a visor, a facemask, or a helmet, though an HMD system is not limited to these forms. The HMD system 160 may be in communication with the interface device 130 described herein. In other embodiments, the HMD system 160 may replace the interface device 130 such that the HMD system 160 can itself detect input received on a user's skin. In other embodiments, the interface device 130 described herein may comprise at least one of or both the interface device 130 and the HMD system 160.

The HMD system 160 may comprise a communication interface 162, a processor 164, a memory 166, a projector and/or camera or other image-capturing module 169, and a display 168. The communication interface 162 may enable the HMD system 160 to interact with the other devices presented in FIG. 2. The processor 164 may be used to execute an application 167 comprised in the memory 166. Example applications include an application to project an interface (e.g., the clipboard interface, the first device interface, the second device interface, etc.) or to determine a direction associated with a user's gaze or a user's body part using the camera or other image-capturing module 169. Additionally, the memory may comprise a datastore 168. The datastore 168 may temporarily or permanently store the data transmitted from the first and/or second device to the HMD system 160.

Each of the devices (the first device 140, the second device 150, the interface device 130, the HMD system 160) displayed in FIG. 2 may communicate with the other devices via one or more wired or wireless mechanisms. Examples of wireless mechanisms include near-field communication (NFC), infrared transmission (IR), Bluetooth, short-range radio frequency (RF) signals, IEEE 802.11x, WiFi, wireless universal serial bus (USB), HomeRF, IrDA-based (Infrared Data Association) transmission, etc. The invention is not limited to any wired or wireless mechanisms described herein.

In some embodiments, an HMD system 160 described herein includes at least one display unit (e.g., display 168) and at least one image-capturing module and at least one light source (e.g., a projector and camera 169). The HMD system 160 may include a display unit in front of only one eye (monocular HMD) or a display unit in front of each eye (binocular HMD). The display unit may be based on cathode ray tube (CRT), liquid crystal display (LCD), liquid crystal on Silicon (LCoS), light-emitting diode (LED), organic light-emitting diode (OLED), etc. Embodiments of the invention are not limited to any particular display technology. An HMD system 160 as described herein may display a computer generated image, a live or delayed image from the real world, or a combination of both images. The HMD system 160 comprises a projector to project an image onto a display of the HMD system 160. In some embodiments, the projector may be a projector associated with presenting overlay information on a display in an augmented reality (AR) system. As used herein, augmented reality (AR) refers to a view (e.g., live view or a delayed view) of a real-world environment where elements of the real-world environment are augmented by computer-generated input such as images, sound, etc. The HMD system 160 described herein may be in communication (e.g., wired or wireless) with the interface device 130 described herein.

In some embodiments, the projector and an image-capturing module (e.g., module 169) in the HMD system 160 may enable gaze tracking In some embodiments, the projector and the image-capturing module comprise a gaze-tracking system. Gaze tracking is the process of tracking the point of gaze (the line of sight associated with an eye or what an eye is looking at) over a period of time. In some embodiments, gaze tracking includes the steps of illuminating the eye using a light source, thereby causing visible reflections from various boundaries of the eye. Some of these reflections may be referred to as Purkinje images. One type of visible reflection that is tracked is the glint. The glint is the small amount of light that is reflected by the cornea. The glint may also be referred as the first Purkinje image.

As used herein, gaze tracking may include the steps of generating the reflection and tracking the reflection. The reflection may be generated by transmitting light into the eye using the projector (or any other light source). In some embodiments, an image-capturing module in the HMD system 160 may be used to capture and/or track various characteristics associated with the glint (e.g., distance, direction, and orientation of the glint with respect to a gaze tracking system, e.g., a light source and/or an image-capturing module). In some embodiments, an orientation as described herein may include at least one of an azimuth, an elevation, or a tilt associated with the glint. In other embodiments, gaze tracking may be performed by tracking both the glint and the position of the eye's pupil or the substantially central portion of the eye's pupil. In still other embodiments, gaze tracking may be performed by tracking the glint and a reflection from the pupil (or a reflection from any other surface or boundary of an eye). In such embodiments, a vector formed by the angle between the glint and the pupil reflection (or a reflection from any other surface or boundary of an eye) may be combined with other geometrical data to determine the gaze direction.

In further embodiments (e.g., a dual-Purkinje gaze tracking system), gaze tracking may be performed by tracking one or more reflections from the front of the cornea (the glint or the first Purkinje image) and from the back of the lens of the eye (the fourth Purkinje image). In such embodiments, data associated with both reflections may be used to determine the gaze direction.

In still further embodiments, gaze tracking may be performed by tracking and/or imaging (i.e., generating an image of) features inside the eye (e.g., the retinal blood vessels). In some embodiments, an image-capturing module described herein has the ability to continue to track and image these features while the eye or various parts of the eye move or rotate. In such embodiments, the image-capturing module may or may not track reflections from the retina. In embodiments where reflections are tracked, the image-capturing module detects, tracks, and images reflections from the retina (or the retinal blood vessels) or changes in reflections from the retina (or the retinal blood vessels) over a period of time.

Embodiments of the present invention are not limited to any particular method to determine the gaze direction. Additionally, in embodiments where the gaze tracking system supports multiple gaze tracking embodiments, the gaze tracking system may allow a user to switch between the various modes. When the gaze tracking system switches between modes, the gaze tracking system may automatically configure itself to perform gaze tracking using the selected mode. For example, when the gaze tracking system shifts from a mode associated with tracking reflections from one or more parts of an eye to a mode associated with tracking and imaging features inside the eye (e.g., retinal blood vessels), the image-capturing module may be configured to automatically change its focus to support the selected mode. In other embodiments, a combination of one or more of the above-described embodiments may be used to determine the gaze direction.

Although gaze tracking is described herein as tracking the glint, embodiments of the invention are not limited to tracking the glint. Embodiments of the invention are directed to tracking a reflection associated with any surface or boundary associated with the eye (e.g., a boundary or surface other than the cornea). Therefore, as used herein, the glint may refer to a reflection from the surface of the cornea or any other surface or boundary associated with the eye.

As described herein, a system for gaze tracking includes both a light source and an image-capturing module. In some embodiments, the light source shines light onto an eye. Embodiments of the invention are not limited to any particular type (or frequencies) of light that can be shone onto the eye. In some embodiments, the light source and the image-capturing module are included in the same system, e.g., a system that comprises a single housing. In alternate embodiments, the light source and the image-capturing module are included in separate systems or separate housings.

An image-capturing module as described herein may include a camera or any component capable of capturing an image or a stream of images (video). The image-capturing module may be a digital camera or a digital video camera. Additionally, the image-capturing module may provide for automatic and/or manual adjustment of a camera setting (e.g., the focus setting). In some embodiments, the image-capturing module comprises an optical sensor in addition to or instead of a camera. The image-capturing module may detect one or more reflections (or change in reflections) from various surfaces associated with an eye, analyze data associated the one or more reflections, and determine the gaze direction based at least partially on the analyzed data.

The image-capturing module described herein may focus on just a single eye or may focus on both eyes and detect and/or record the movement of an eye as the viewer looks at a stimulus. As used herein, a user or viewer of the gaze tracking system may be equivalent. Additionally, the image-capturing module may use one or more techniques to locate or track the pupil or the center (or a substantially central portion) of the pupil. For example, the image-capturing module may use infrared (IR) or near-IR non-collimated light to generate a reflection associated with the cornea or associated with any other part of the eye (e.g., the lens). In some embodiments, the image-capturing module may generate a vector between the center (or a substantially central portion) of the pupil and the generated reflection in order to determine the gaze direction.

A gaze tracking system (or an image-capturing module associated with a gaze tracking system) described herein enables both bright pupil and dark pupil tracking in order to determine the location of the pupil or the center of the pupil. The difference between bright pupil tracking and dark pupil tracking is the location of the light source (e.g., the projector) with respect to the optical path. If the light source is coaxial with the optical path, the eye acts as a retroreflector as light reflects from the retina thus rendering a bright pupil effect. As used herein, a retroreflector is a surface that reflects light back to its source with minimal scattering of light. If the light source is offset from the optical path, the pupil appears dark because retroreflection from the retina is directed away from the image-capturing module. Therefore, an image-capturing module described herein enables either bright pupil tracking or dark pupil tracking based at least partially on whether a light source described herein is coaxial with or offset from the optical path. As used herein, the optical path is a path that light takes in traversing the gaze tracking system.

In some embodiments, at least one of the interface device 130, the HMD system 160, the first device 140, or the second device 150 determines whether the user intends to interact with at least one of the first device 140 or the second device 150. In some embodiments, at least one of the interface device 130, the HMD system 160 (or some other gaze-determining device), the first device 140, or the second device 150 comprises at least one image-capturing module (e.g., a camera or a video camera) that determines the direction of the user's gaze to determine whether the user's gaze is directed at (and consequently whether the user intends to interact with) at least one of the first device 140, the second device 150, the clipboard interface, the HMD system 160, or the interface device 130. The information regarding the user's gaze is coupled with input received at least one of the interface device 130, the HMD system 160, the first device 140, the second device 150, or the user's skin to determine an input instruction to be executed with respect to the user interface displayed on at least one of the first device 140, the second device 150, the clipboard interface, or the HMD system interface. For example if the user is looking at the first device 140 and touches the user's skin (e.g., the skin on the left arm or hand), at least one of the first device 140, the second device 150, the interface device 130, or the HMD system 160 determines the user's gaze, along with the interface device 130 detecting the user's touch, in order to determine that the input instruction is to drag a window to the edge of the first device's user interface.

In some embodiments, at least one of the interface device 130, the HMD system 160 (or some other gaze-determining device), the first device 140, or the second device 150 comprises at least one image-capturing module (e.g., a camera or a video camera) that determines the direction and/or orientation of the user's body part to determine whether the user's body part is pointing at (and consequently whether the user intends to interact with) at least one of the first device 140, the second device 150, the interface device 130, the clipboard interface projected onto the user's skin, or the HMD system interface. In some embodiments, the body part may be any part of the upper limb (e.g., forearm, arm, elbow, shoulder, hand, wrist, palm, finger, etc.), or the lower limb (e.g., hip, thigh, knee, leg, ankle, foot, toe, etc.). The parts of the body are not limited to those described herein. The information regarding the direction and/or orientation of the user's body part is coupled with input received at least one of the interface device 130, the first device 140, the second device 150, the HMD system 160, or the user's skin to determine an input instruction to be executed with respect to the user interface displayed on at least one of the first device 140, the second device 150, the HMD system 160, or the clipboard interface projected onto the user's skin. For example if the user points at the first device with the user's right index finger and subsequently touches the user's skin (e.g., the skin on the user's left upper limb such as the arm or wrist), at least one of the first device 140, the second device 150, the interface device 130, or the HMD system 160 determines the direction and/or orientation of the user's finger, along with the interface device 130 detecting the user's touch, in order to determine that the input instruction is to drag a window to the edge of the first device's user interface. As used herein, the orientation of the user's body part refers to at least one of an azimuth, an elevation, or a tilt associated with the user's body part.

In other embodiments a user may simply point at a particular object (e.g., a window) on the first device display with the user's right index finger (or any other body part that enables pointing) and move the right index finger from right to left (without touching the user's skin). An image-capturing module associated with at least one of the first device 140, the second device 150, the interface device 130, or the HMD system 160 captures this movement, and determines that the movement is an input instruction to move the particular object from the right edge or center of the user interface of the first device display 140 towards the left edge of the user interface.

As a further example, after content has been transmitted from the first device 140 to the interface device 130, if the user points at the second device 150 with the user's index finger, the content is transmitted from the first device 140 to the second device 150 (or transmitted from the first device 140 to the second device 150 via the interface device 130). As a further example, after content has been transmitted from the first device 140 to the interface device 130, if the user uses the user's right index finger to point at the user's left palm, the content is transmitted from the first device 140 to the interface device 130, and the interface device 130 projects the transmitted content on the user's left palm.

Figure 3:
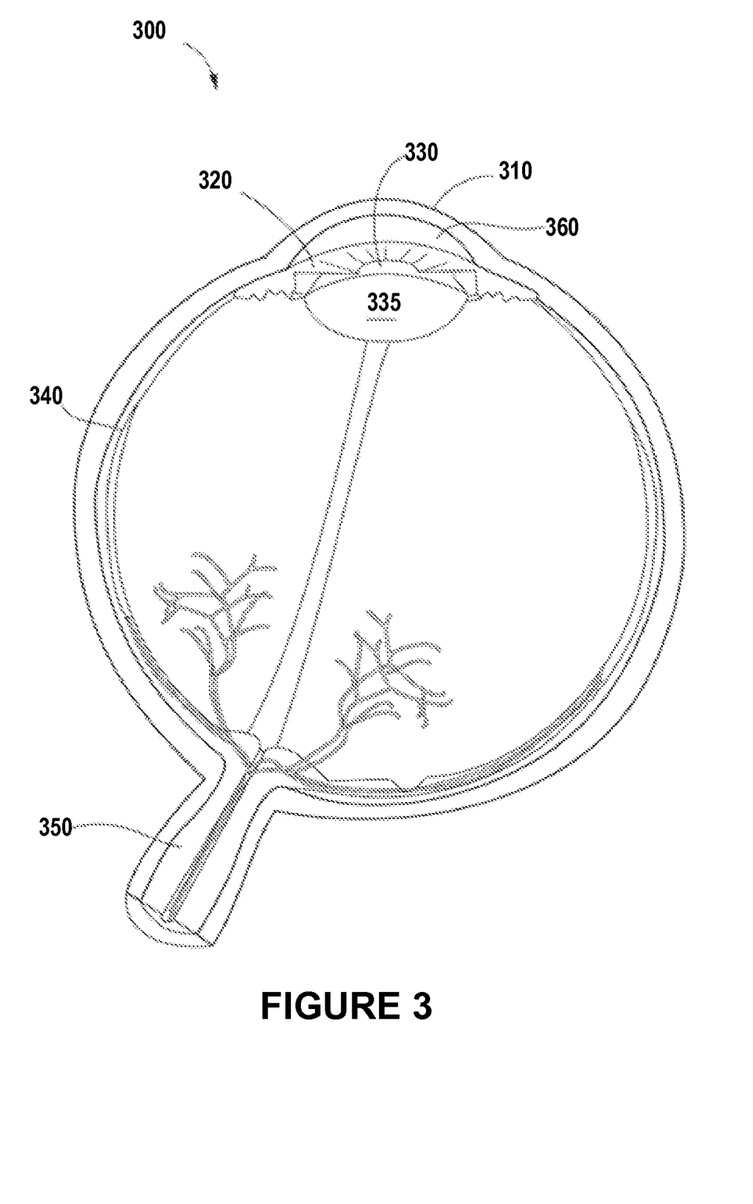
FIG. 3 is an exemplary picture of the parts of an eye.

Referring now to FIG. 3, FIG. 3 presents the parts of the eye described with respect to FIG. 3. The important parts of a human eye 300 include the cornea 310, the iris 320, the pupil 330, the lens 335, the retina 340, and the optic nerve 350. The cornea 310 is the clear outer bulging surface at the front of the eye. The cornea 310 is the major refractive surface of the eye. The iris 320 is the colored part of the eye that regulates an amount of light entering the eye. The pupil 330 is the opening at the center of the iris 320. The iris 320 modifies or adjusts the size of the pupil 330 and thereby controls the amount of light that enters the eye. The lens 335 is the clear part of the eye behind the iris 320 that focuses light on the retina 340. The retina 340 is a light-sensitive tissue lining at the back of the eye. The retina 340 transforms light into electrical signals that are transmitted to the brain via the optic nerve. The aqueous humor 360 is a gelatinous fluid that is located in the space between the lens 335 and the cornea 310. The function of the aqueous humor 360 is to maintain the intraocular pressure and inflate the globe of the eye.

Figure 4:
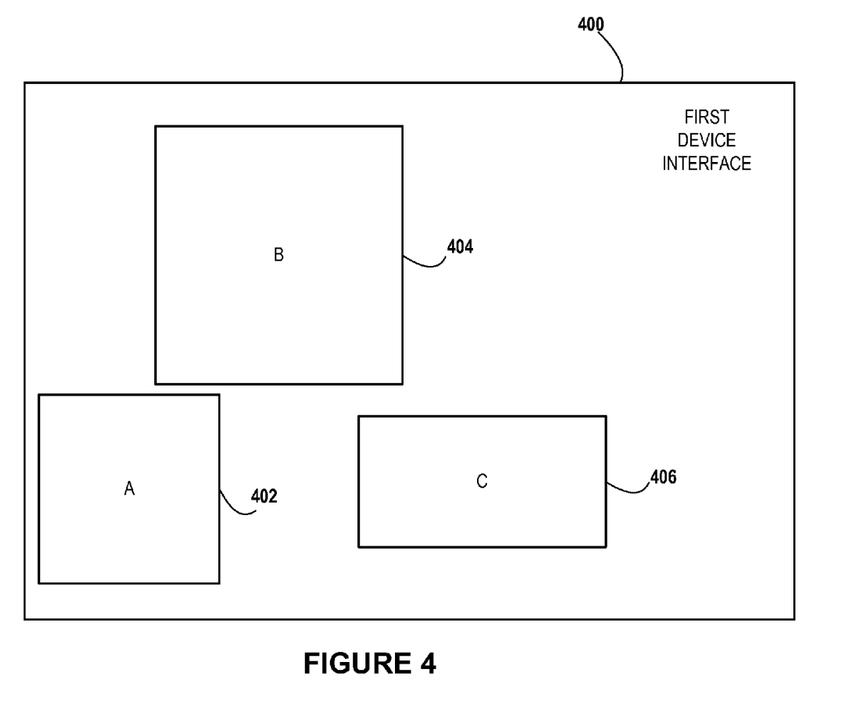
FIG. 4 is an exemplary user interface associated with the first device, in accordance with embodiments of the present invention.

Referring now to FIG. 4, FIG. 4 presents a visual user interface associated with a first device. As presented in FIG. 4, the first device presents at least one object 402, 404, and 406. The object may represent data. The data may comprise at least one of text, video, audio, images, etc. Therefore, the data comprises "content" as described herein. The object may represent an executable object that has not yet been executed (e.g., a selectable icon, which when selected displays a video file). The object may represent an object that is currently being executed (e.g., a video file that is currently being displayed by the first device). In some embodiments, an object on the first device may be selected using input received at the first device (e.g., a touch on a touch screen associated with the first device, a mouse click, etc.). The object may be copied by selecting a copy function at the first device. In other embodiments, the object may be selected using input received on the user's skin.

In some embodiments, the interface device determines whether the content 402 to be transmitted from the first device to the second device is dragged towards an edge (e.g., the top edge, the right edge, the left edge, the bottom edge) of a visual interface. In some embodiments, the interface device determines that the content 402 is dragged towards the edge of the interface if at least a part of the content (e.g., a window or an icon) is at least partially located within a predetermined distance (e.g., two inches) from the edge of the user interface.

In some embodiments, the content 402 is dragged to the edge of the user interface using input received on a user's skin or using input (e.g., touch) received directly at least one of the first device, the second device, or the interface device. When input is received at the user's skin (or a different user's skin), the input is converted into an input instruction in one of two ways. In one embodiment, the interface device converts the input (e.g., one or more characteristics associated with the user's touch) into an input instruction and transmits the input instruction to the first device. In another embodiment, the interface device directly transmits the input (e.g., one or more characteristics associated with the user's touch) directly to the first device, and the first device converts the input into an input instruction. The various characteristics of the touch have been described earlier.

Subsequently, in order to initiate transmission of content 402 from the first device to either the second device or to the interface device, the user inputs a type of touch on the user's skin. The interface device determines that the type of touch is an instruction to initiate transmission of content 402 from the first device to either the second device or to the interface device. For example, after the content 402 is dragged to the edge of the user interface of the first device, the user taps on the user's arm in the direction of the drag (e.g., the content is dragged from right to left, and the user taps the left arm using a finger or any other part of the right arm).

In alternate embodiments, the content 402 does not need to be dragged towards the edge of the first device in order to initiate transmission of content from the first device to either the second device or to the interface device. In such embodiments, the content 402 can be transmitted to either the second device or to the interface device by inputting a type of touch on the user's skin.

Figure 5:
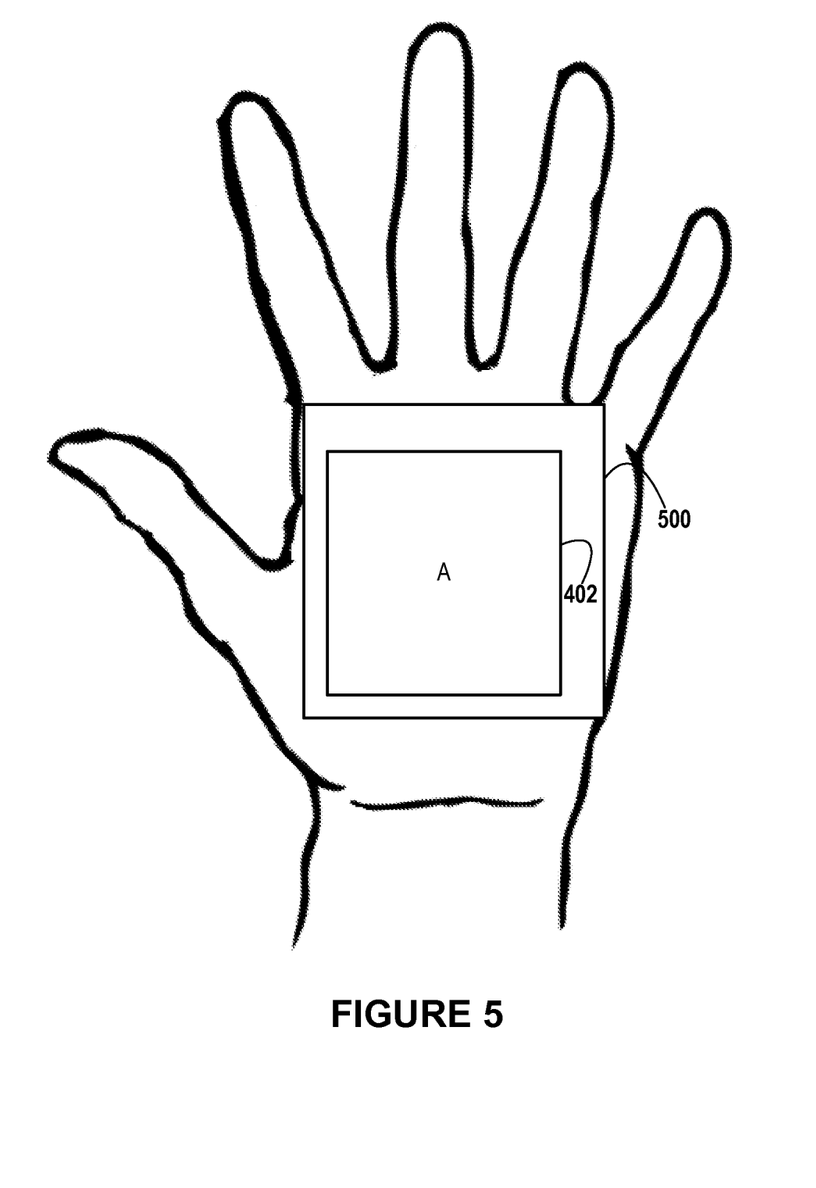
FIG. 5 is an exemplary clipboard interface, in accordance with embodiments of the present invention.

Referring now to FIG. 5, FIG. 5 presents a clipboard user interface 500. In some embodiments, the user can directly transmit content from the first device to the second device using input received at least one of the first device, the second device, or the interface device. In some embodiments, the user transmits content from the first device to the interface device using input received at least one of the first device, the second device, or the interface device. Therefore, for example, when the user drags content from right to left of the user interface of the first device and taps on the user's left arm, the content is now displayed on the clipboard user interface.

The interface device projects the "clipboard" interface 500 onto a location of the user's skin or a HMD system display as determined by the user (or onto both the user's skin and the HMD system display). The interface is referred to as the clipboard interface because the interface presents the content 402 being transmitted from the first device to the second device. Therefore, the interface device may serve as an intermediary storage system between the transmitting (or copying or cutting) of content 402 from the first device and receiving (or pasting) of content 402 at the second device. In some embodiments, since the area of the clipboard user interface 500 (e.g., the user's palm) may be smaller than the user interface area associated with at least one of the first device or the second device, the clipboard user interface 500 presents a thumbnail (e.g., a smaller version) of the content transmitted from the first device. In some embodiments, the user interface 500 has a quadrilateral shape; however, in other embodiments, the user interface 500 may have other shapes (e.g., circular, elliptical, triangular, polygonal, etc.).

The user may change the location of the projection (e.g., the location on the user's skin or the location on the HMD system display) by inputting a type of touch on the user's skin, where the type of touch is detected by the interface device. In other embodiments, the user may change the location of the projection by transmitting an input directly to the interface device (e.g., by touching the interface device, or selecting an option via an input device (e.g., a remote control device) that is in communication with the interface device). The user may interact with the clipboard user interface 500 similar to a touchscreen display. For example, the user may select a selectable option by touching (or hovering over without touching) the selectable option, and the interface device detects the touch (or the hovering) and determines that the user has selected the selectable option. A processor associated with the interface device processes the selected option and reconfigures the clipboard user interface based on the action associated with the selected option.

When the clipboard user interface 500 is projected onto an HMD system display, the information presented on the HMD system display is secure because only the user of the HMD system display can view the clipboard user interface. However, when the clipboard user interface 500 is projected onto the user's skin, the clipboard user interface 500 may be viewed by other users as well. In some embodiments, the type of information (e.g., sensitive information, non-sensitive information, etc.) displayed on the clipboard user interface 500 is based at least partially on the location of the user's skin on which the clipboard user interface is projected.

Therefore, in some embodiments, the interface device determines whether the clipboard user interface 500 is projected onto a substantially public portion of the user's skin (e.g., visible to people other than the user) or a substantially private portion of the user's skin (e.g., visible to the user and may not be visible to people other than the user). As used herein, a substantially public portion of the user's skin may be the outer surface of the user's upper limb (e.g., the wrist or the outer surface of the user's arm or finger). As used herein, a substantially private portion of the user's skin may be the inner surface of the user's upper limb (e.g., the palm or the forearm or the inner surface of a finger). The public and/or private portions of the user's skin are not limited to the examples provided herein.

Additionally, in some embodiments, either following or prior to the determination of the location of projection of the clipboard user interface 500, the interface device distinguishes sensitive information from non-sensitive information to be presented on the clipboard user interface. As used herein, sensitive information may include information identifying the user (e.g., name, username, password, picture, etc.). Sensitive information may additionally include personal information associated with the user (e.g., an email message). Non-sensitive information may include information that does not identify the user and/or non-personal information (e.g., a public webpage). The distinguishing of sensitive information from non-sensitive information may be based on a predetermined algorithm associated with the interface device. In some embodiments, after the interface device distinguishes the sensitive information from the non-sensitive information, the interface device determines whether the clipboard user interface 500 is to be projected on a substantially public portion of the user's skin or a substantially private portion of the user's skin.

If the interface device determines that that the clipboard user interface 500 is to be projected onto a substantially private portion of the user's skin, the interface device does not censor, screen, or delete any of the sensitive information to be presented on the clipboard user interface 500, and therefore, the clipboard user interface presents both the sensitive information and the non-sensitive information. If the interface device determines that that the clipboard user interface 500 is to be projected onto a substantially public portion of the user's skin, the interface device at least one of censors, screens, or deletes any of the sensitive information to be presented on the clipboard user interface 500. As used herein, censoring or screening the sensitive information refers to replacing the sensitive information with visual information that either indicates or does not indicate that the sensitive information has been censored or screened. As used herein, deleting the sensitive information refers to removing the sensitive information so that it is not displayed on the clipboard user interface 500.

In some embodiments, the clipboard user interface 500 may be projected onto a different user's skin (e.g., a user not in contact with the interface device, and different from the user in contact with the interface device). Therefore, in some embodiments, the location or a type of information presented on the clipboard user interface 500 is based at least partially on whether the interface device is at least in contact with the user's skin or in contact with a different user's skin. In some embodiments, when the interface device determines that the clipboard user interface 500 is to be projected onto a different user's skin, the clipboard user interface 500 distinguishes the sensitive information from the non-sensitive information to be presented on the clipboard user interface 500. Additionally, the interface device determines whether the clipboard user interface 500 is to be projected onto a substantially private portion or a substantially public portion of the other user's skin.

In some embodiments, if the interface device determines that the clipboard user interface 500 is to be projected onto a substantially private portion of the other user's skin, the interface device prevents any part of the clipboard user interface 500 (both sensitive information and non-sensitive information) from being projected onto the substantially private portion of the other user's skin. In other embodiments, if the interface device determines that the clipboard user interface 500 is to be projected onto a substantially private portion of the other user's skin, the interface device projects the non-sensitive information onto the clipboard user interface 500, and at least one of censors, screens, or deletes the sensitive information.

In some embodiments, if the interface device determines that the clipboard user interface is to be projected onto a substantially public portion of the other user's skin, the interface device projects the non-sensitive information onto the clipboard user interface 500, and at least one of censors, screens, or deletes the sensitive information. In other embodiments, if the interface device determines that the clipboard user interface is to be projected onto a substantially public portion of the other user's skin, the interface device projects both the sensitive information and the non-sensitive information onto the clipboard user interface 500.

Figure 6:
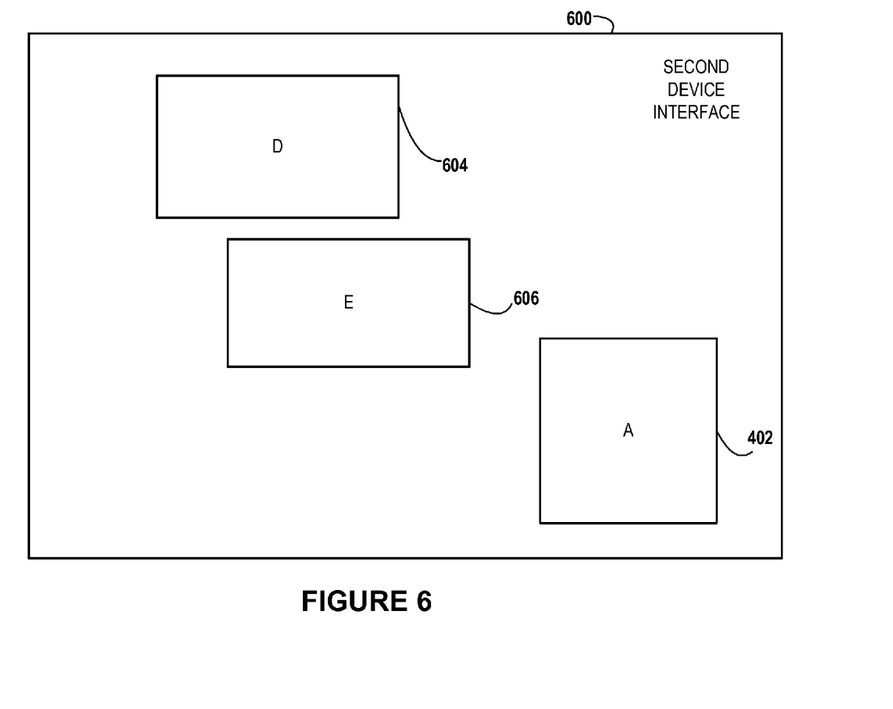
FIG. 6 is an exemplary user interface associated with the second device, in accordance with embodiments of the present invention.

Referring now to FIG. 6, FIG. 6 presents a user interface associated with a second device. The user interface presents three objects 604, 606, and 402. Objects were 604 and 606 were previously present on the second device's user interface when content 402 was transmitted to the second device. In some embodiments, the content 402 is transmitted from the first device to the interface device, and subsequently transmitted from the interface device to the second device. In other embodiments, the content 402 is transmitted directly from the first device to the second device. In some embodiments, the transmission of content 402 from the first device to the second device, or from the interface device to the second device, can be caused by input received by at least one of the interface device, the first device, the second device, or the user's skin.

As indicated in FIG. 6, the 'A' window can now be viewed on the second device. In some embodiments, the transmission of content 402 from the first device to the second device results in the content 402 being deleted or removed from the first device. In other embodiments, the transmission of content 402 from the first device to the second device does not result in the content 402 being deleted or removed from the first device; instead, the content 402 is retained on the first device such that the same content is viewable on both the first device and the second device.

In order to execute transmission of content 402 from the first device to the second device or from the interface device to the second device, the user inputs a type of touch on the user's skin (e.g., the user taps on a selectable option presented on the clipboard user interface projected onto the user's skin) The interface device determines that the type of touch is an instruction to initiate transmission of content 402 from the interface device or the first device to the second device.

In other embodiments, the transmission of content 402 from the interface device (or from the first device) to the second device is executed using input (e.g., touch input) received directly at least one of the first device (e.g., on a touchscreen display), or the second device (e.g., on a touchscreen display), or the interface device (e.g., one of more selectable digital or physical buttons on the interface device).

In still other embodiments, the transmission of content 402 from the interface device (or from the first device) to the second device can be executed by the user pointing the user's body part in the direction of the second device. An image-capturing device associated with at least one of the interface device, the first device, or the second device, determines the direction and/or orientation associated with the user's body part, and determines that the user's body part is pointing substantially in the direction of the second device, and in response to either determining (or receiving information from at least one of the first device or the second device) that the user's body part is pointing substantially in the direction of the second device, the interface device (or the first device) transmits content 402 from the interface device (or the first device) to the second device. In some embodiments, the body part may be any part of the upper limb (e.g., forearm, arm, elbow, shoulder, hand, wrist, palm, finger, etc.), or the lower limb (e.g., hip, thigh, knee, leg, ankle, foot, toe, etc.). The parts of the body are not limited to those described herein.

In some embodiments, in addition to pointing the user's body part in the direction of the second device, the user may make a gesture in the air, or may input a touch on the user's skin. This additional gesture and/or touch may be necessary in order for the interface device (or the first device) to determine that the user intends to complete the process of transmitting content 402 from the interface device (or the first device) to the second device.

In still other embodiments, rather than pointing at the second device, the user may look at the second device in addition to, or instead of, at least one of making a gesture in the air or inputting a touch on the user's skin either prior to after looking at the second device. An image-capturing module associated with at least one of the first device, the second device, the interface device, or the HMD system may determine the direction associated with the user's gaze and couple the user's gaze with at least one of the user's gesture or touch on the user's skin to determine that the user intends to complete the process of transmitting content 402 from the interface device (or the first device) to the second device.

Figure 7:
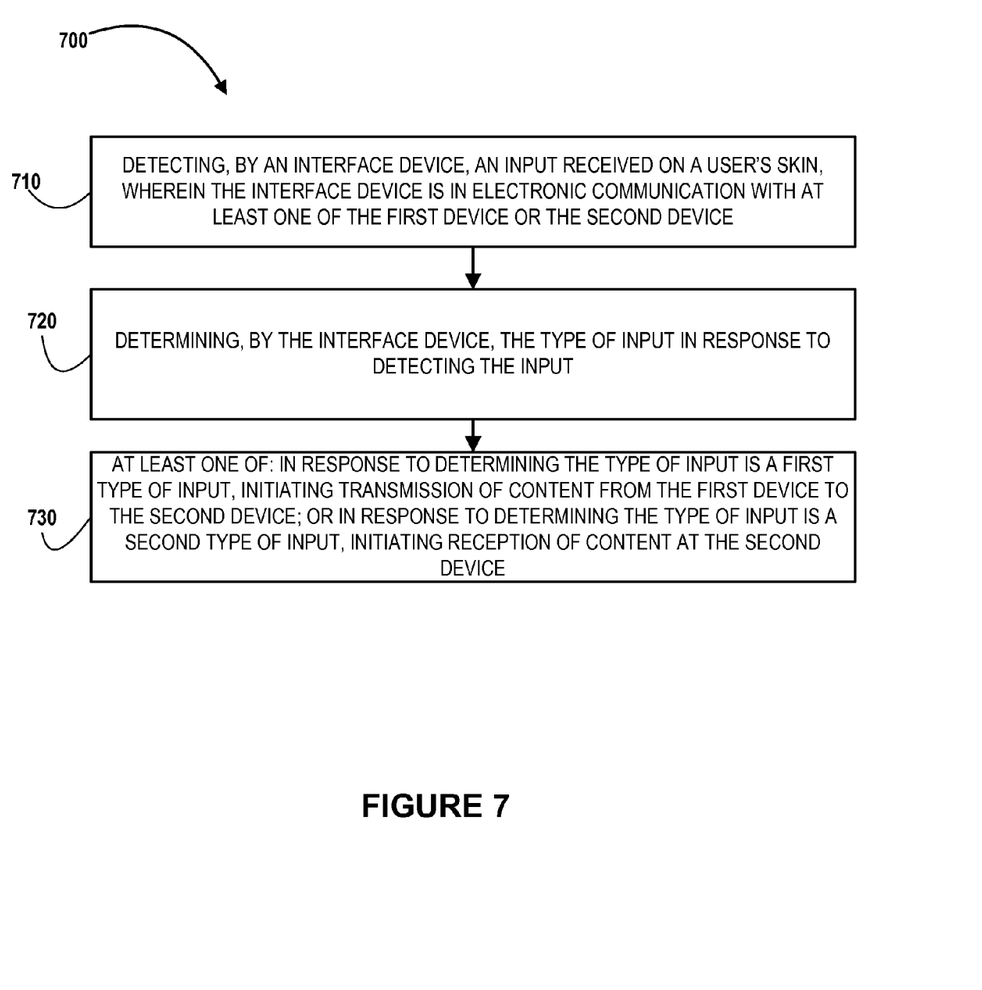
FIG. 7 is an exemplary process flow for transferring content from a first device to a second device, in accordance with embodiments of the present invention.

Referring now to FIG. 7, FIG. 7 presents a process flow 700 for transmitting content from a first device to a second device. The various process blocks presented in FIG. 7 may be executed in an order that is different from that presented in FIG. 7. Additionally, in other embodiments, the process flow may comprise more or fewer process blocks compared to those presented in FIG. 7. At block 710, the process flow comprises detecting, by an interface device, an input received on a user's skin, wherein the interface device is in electronic communication with at least one of the first device or the second device. At block 720, the process flow comprises determining, by the interface device, the type of input in response to detecting the input. At block 730, the process flow comprises at least one of: in response to determining the type of input is a first type of input, initiating transmission of content from the first device to the second device; or in response to determining the type of input is a second type of input, initiating reception of content at the second device.

In accordance with embodiments of the invention, the term "module" with respect to a system (or a device) may refer to a hardware component of the system, a software component of the system, or a component of the system that includes both hardware and software. As used herein, a module may include one or more modules, where each module may reside in separate pieces of hardware or software.

As used herein, the term "automatic" refers to a function, a process, a method, or any part thereof, which is executed by computer software upon occurrence of an event or a condition without intervention by a user.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for transmitting content from a first device to a second device, the method comprising:
   detecting, by an interface device, an input received on a user's skin, wherein the interface device is in communication with at least one of the first device or the second device, wherein the interface device comprises at least one sensor, microphone, or camera that detects a vibration associated with the user's body when the input is received on the user's skin;
   determining a direction or orientation associated with a body part of the user when detecting the input;
   determining, by the interface device camera, a direction of the user's gaze; and
   at least one of:
      determining the user intends to interact with the first device when the user's gaze is directed substantially at the first device;
      determining the user intends to interact with the second device when the user's gaze is directed substantially at the second device; or
      determining the user intends to interact with a user interface presented on the user's skin when the user's gaze is directed substantially at the user's skin;
   determining whether the input is to be received by the first device or the second device based on the direction or orientation of the user's body part and the direction of the user's gaze; wherein,
   in response to detecting the input and determining a device to receive the input, determining the type of input; and
   at least one of:
      in response to determining the type of input is a first type of input, initiating transmission of content from the first device to the second device; or
      in response to determining the type of input is a second type of input, initiating reception of content at the second device.

2. The method of claim 1, wherein the interface device projects a user interface associated with at least one of the first device, the second device, or the interface device onto at least one of the user's skin or a head-mounted display.

3. The method of claim 1, further comprising:
   determining whether the content is dragged towards an edge of a visual interface associated with the first device, wherein the content is dragged towards the edge of the visual interface using at least one of input received at the first device or input received on the user's skin.

4. The method of claim 3, wherein the determining whether the content is dragged towards an edge of a visual interface associated with the first device is executed at least one of prior to or after receiving the input on the user's skin.

5. The method of claim 1, wherein the interface device projects a clipboard interface onto at least one of the user's skin or a head-mounted display, the clipboard interface presenting the content being transmitted from the first device to the second device.

6. The method of claim 1, wherein the interface device projects a user interface associated with at least one of the first device, the second device, or the interface device onto a location of a user's skin, wherein at least one of the location or a type of information presented on the user interface is based at least partially on whether the interface device is at least one in contact with the user's skin or in contact with a different user's skin.

7. The method of claim 1, further comprising:
   initiating reception of content at the interface device, the content being transmitted from the first device; and
   initiating transmission of content from the interface device to the second device.

8. The method of claim 1, further comprising:
   completing transmission of content from the first device to the second device based on input received by at least one of the interface device, the first device, the second device, or the user's skin.

9. The method of claim 2, further comprising:
   determining a location of projection of the user interface onto the user's skin or a different user's skin;
   distinguishing sensitive information from non-sensitive information, wherein the content received at the interface device comprises at least one of sensitive information and non-sensitive information; and
   at least one of:
   in response to determining the location of projection on the user's skin or the different user's skin is a substantially public location, projecting the non-sensitive information onto the user interface and screening the sensitive information;
   in response to determining the location of projection on the user's skin is a substantially private location, projecting both the sensitive information and the non-sensitive information onto the user interface; or
   in response to determining the location of projection on the different user's skin is a substantially private location, screening both the sensitive information and the non-sensitive information.

10. The method of claim 1, further comprising:
    determining whether the user intends to interact with at least one of the first device or the second device.

11. The method of claim 10, wherein the determining step further comprises:
    using at least one image-capturing device associated with at least one of the interface device, the first device, or the second device:
       determining whether a body part of the user is pointing substantially in a direction of at least one of the first device or the second device, and
       determining movement of the body part; and
    converting the movement of the body part into an input instruction to at least one of the first device, the second device, or the interface device.

12. The method of claim 1, wherein the interface device comprises at least one of a bracelet wearable on the user's arm or a visor wearable on the user's head.

13. The method of claim 1, wherein the interface device comprises at least one of an image-capturing module or a wireless communication module, and wherein the at least one sensor or camera comprises an infrared (IR) sensor or camera.

14. The method of claim 1, wherein the interface device is either in contact with or not in contact with the user's skin.

15. The method of claim 1, wherein the interface device is not in contact with the user's skin, and is in contact with a different user's skin.

16. The method of claim 1, wherein the input received on the user's skin comprises a contact on the user's skin, wherein the contact on the user's skin comprises a contact of at least one of a body part or an object on the user's skin, and wherein the determining step comprises determining at least one of: a type of contact on the user's skin, an approximate location of contact on the user's skin, a duration of contact with the user's skin, a speed or acceleration associated with the contact on the user's skin, a pressure or force associated with the contact on the user's skin, a quantity of distinct contacts with the user's skin, a duration between distinct contacts with the user's skin, or a direction of the user's gaze when the contact occurs.

17. The method of claim 1, wherein at least one of the first device or the second device comprises at least one of a portable mobile communication device, a television, a computing device, a tablet, or a watch.

18. A system for transmitting content from a first device to a second device, the system comprising:
 an interface device comprising at least one sensor, microphone, or camera that detects a vibration associated with the user's body; and
 a processor configured to:
 determine a direction or orientation associated with a body part of the user when detecting the vibration, the vibration being associated with an input;
 determine, by the camera, a direction of the user's gaze; and
 at least one of:
  determine the user intends to interact with the first device when the user's gaze is directed substantially at the first device;
  determine the user intends to interact with the second device when the user's gaze is directed substantially at the second device; or
  determine the user intends to interact with a user interface presented on the user's skin when the user's gaze is directed substantially at the user's skin;
 determine whether the input is to be received by the first device or the second device based on the direction or orientation of the user's body part and the direction of the user's gaze;
 determine a type of input and a device to receive the input based at least partially on the vibration; and
 at least one of:
  in response to determining the type of input is a first type of input, initiate transmission of content from the first device to the second device; or
  in response to determining the type of input is a second type of input, initiate reception of content at the second device, wherein the system is in communication with at least one of the first device or the second device.

19. A computer program product, executed by an interface device comprising at least one sensor, microphone, or camera, for transmitting content from a first device to a second device, the computer program product comprising:
 a non-transitory computer-readable medium comprising code configured to:
 determine an input on a user's body, the input being associated with a vibration on the user's body;
 determine a direction or orientation associated with a body part of the user when determining the input;
 determine, by the interface device camera, a direction of the user's gaze; and
 at least one of:
  determine the user intends to interact with the first device when the user's gaze is directed substantially at the first device;
  determine the user intends to interact with the second device when the user's gaze is directed substantially at the second device; or
  determine the user intends to interact with a user interface presented on the user's skin when the user's gaze is directed substantially at the user's skin;
 determine whether the input is to be received by the first device or the second device based on the direction or orientation of the user's body part and the direction of the user's gaze;
 determine a type of input and a device to receive the input based at least partially on detecting the vibration on the user's body; and
 at least one of:
  in response to determining the type of input is a first type of input, initiate transmission of content from the first device to the second device; or
  in response to determining the type of input is a second type of input, initiate reception of content at the second device.

\* \* \* \* \*